United States Patent

[11] 3,600,615

[72] Inventor Tarou Morita
    6, 2-Chome, Gotenhama, Otu-shi, Japan
[21] Appl. No. 3,878
[22] Filed Jan. 19, 1970
[45] Patented Aug. 17, 1971

[54] MINIATURE MOTOR
    3 Claims, 3 Drawing Figs.
[52] U.S. Cl. .................................................. 310/40,
    310/42, 310/154
[51] Int. Cl. ..................................................... H02k 15/02
[50] Field of Search ........................................ 310/40, 40
    MM, 42, 90, 154, 258, 254; 46/243

[56] References Cited
    UNITED STATES PATENTS
3,323,252 6/1967 Gipperich et al. ............ 310/154 X
3,445,692 5/1969 Kato ............................. 310/42

Primary Examiner—D. F. Duggan
Attorney—George B. Oujevolk

ABSTRACT: A miniature motor for moving toys comprising a rotor, a shaft on said rotor is fixedly mounted for rotation therewith, a rectifier element fixedly mounted on said rotor shaft, a pair of supporting discs made of permanent magnets for rotatably supporting said rotor shaft, a pair of semicircle section magnetic cover members surrounding said rotor in a peripherally spaced relation thereto and held in position on said supporting discs by the magnetic attraction force of said supporting discs and mechanical means, said cover members having mating notches at the adjacent side edges to define an opening, a brush holder fitted in said opening and having a pair of brushes to pinch said rectifier element therebetween an adhesive tape applied around the periphery of said pair of cover members to secure the cover members together.

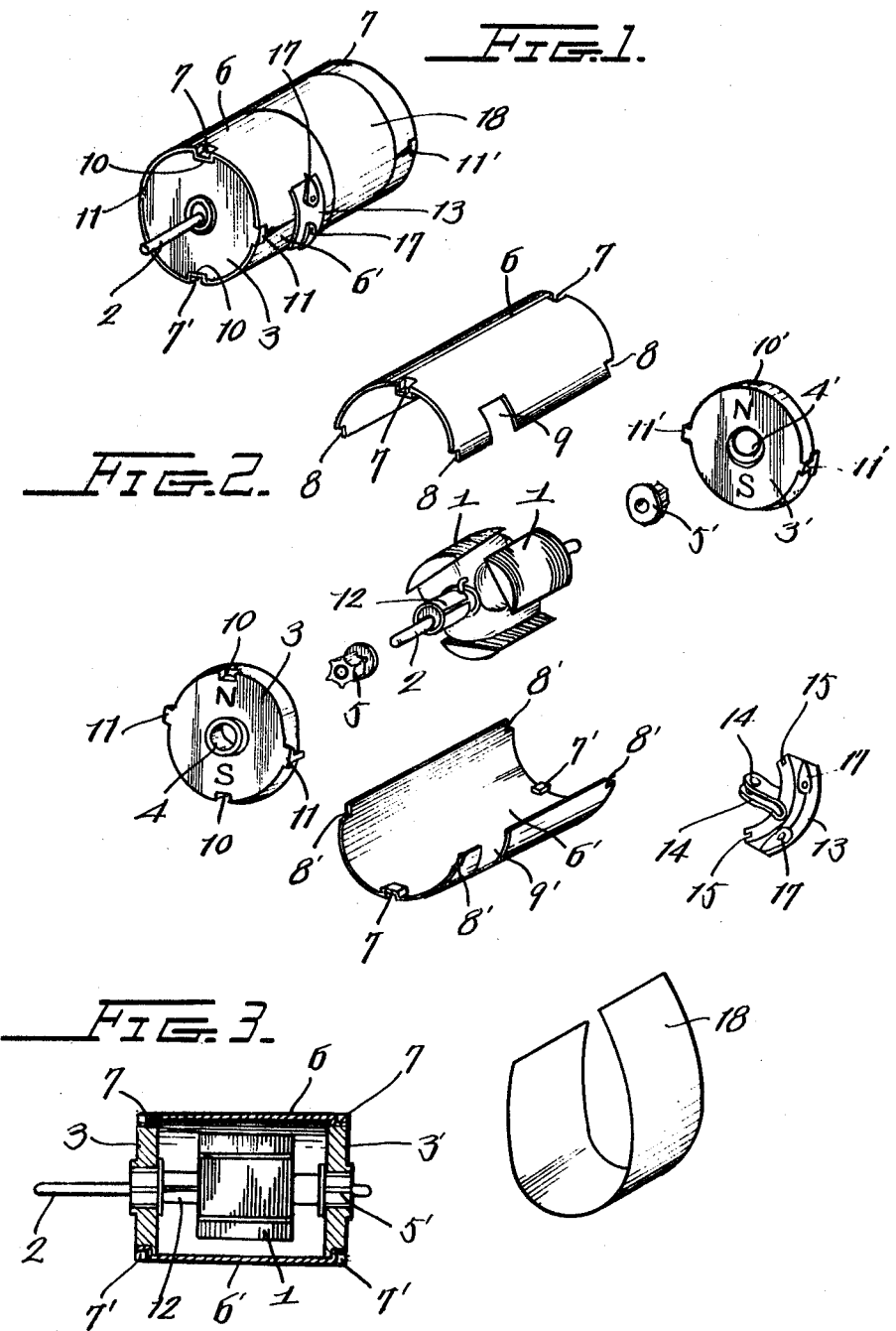

MINIATURE MOTOR

BACKGROUND OF THE INVENTION

There have been proposed and practically used a varieties of types of miniature motors for moving toys such as model aircrafts, locomotive engines, ships, vehicles, automobiles and the like and most of the conventional miniature motors for moving toys comprises essentially a rotor, a shaft on which said rotor is fixedly mounted for rotational movement therewith, and a metallic cylindrical member housing said rotor and shaft assembly and supported and held in position at the opposite ends by a pair of synthetic resin supporting discs which also rotatably support the rotor shaft at the opposite ends.

SUMMARY OF THE INVENTION

The present invention relates to a miniature motor for moving toys such as model aircrafts, locomotive engines, ships, vehicles, automobiles and the like.

On object of the present invention is to provide an improved miniature motor for moving toys which is simpler in construction and more readily assembled and disassembled as compared with the conventional miniature motors for moving toys.

Another object of the present invention is to provide an improved miniature motor for moving toys in which almost all of the components parts of the motor have configurations which are readily rollable thereby to make the motor suitable for the conveyor system production through the utilization of the rolling movement of such component parts.

According to the present invention, there is provided a miniature motor for moving toys which comprises a rotor having a rotary shaft, a pair of spaced supporting discs made of permanent magnets and rotatably supporting said rotor shaft at its opposite ends, a pair of semicircle cross section cover members mating at their adjacent side edges and held in position on said pair of supporting discs by the attraction force of the discs and mechanical means for surrounding said rotor in peripherally spaced relation thereto, a rectifier element fixedly supported on said rotor shaft, a pair of brushes pinching said rectifier element therebetween and an adhesive tape applied around the periphery of said pair of cover members for securing the cover members together.

The above and other objects and attendant advantages of the present invention will be more readily apparent to those skilled in the art from a reading of the following detailed description of the invention in connection with the accompanying drawing which shows one preferred form of the invention for illustration purposes only, but not for limiting the scope of the same.

BRIEF DESCRIPTION OF THE DRAWING

FIG. 1 is a perspective view of one preferred form of miniature motor for moving toys according to the present invention;

FIG. 2 is an exploded view of said motor; and

FIG. 3 is a longitudinally sectional view of said motor taken along substantially the longitudinal axis thereof.

PREFERRED EMBODIMENT OF THE INVENTION

The present invention will be now described referring to the accompanying drawing which illustrates one preferred form of miniature motor for moving toys by the invention. Reference numeral 1 denotes a rotor which serves as the motive power supply means for a moving toy in which the motor is to be incorporated and the rotor has a rotary shaft 2 extending in the longitudinal axis of the rotor with the opposite ends of the shaft extending beyond the opposite end faces of the body of the rotor. The extending opposite ends of the rotor shaft 2 are rotatably supported by a pair of identical support discs 3 and 3' made of permanent magnets and positioned adjacent to the opposite ends of the rotor 2. For the purpose, the supporting discs 3 and 3' are provided in their center with stepped through bores 4 and 4', respectively, which freely receive nonmagnetic bearings 5 and 5' therein, respectively. Each of the nonmagnetic bearings 5 and 5' is provided in the center with a through bore through which the associated end of the rotor shaft 2 extends and at one or the inner end with a flange which is adapted to abut against the inner surface of the respectively associated supporting disc when the bearing is inserted into the associated stepped through bore in the disc from the inner side of the disc. A pair of identical and symmetrical upper and lower mating magnetic cover members 6 and 6' having a semicircle cross section are disposed about the rotor assembly in a peripherally spaced relation to the assembly to surround the latter and magnetically and mechanically held in position on the supporting discs 3 and 3' in a fixed relation thereto.

The length of the pair of magnetic cover members 6 and 6' is so selected that when the cover members are seated on the supporting discs 3 and 3' the planes of the opposite end faces of the cover members align with those of the outer surfaces of the respectively adjacent supporting discs. The curvature of each of the pair of cover members 6 and 6' is also so selected that when the cover members are mated with each other at the opposite or adjacent side edges with their concave surfaces facing to each other the diameter defined by the facing concave surfaces will substantially correspond to the outer diameter of the supporting discs. For mechanically holding the magnetic cover members 6 and 6' in position, the cover member 6 is provided with projections 7 and 7 along the longitudinal axis at the opposite end edges of the member which projections are formed by pressing down the material of the cover member at the above-mentioned areas so as to cause the material at the pressed areas to project out of the concave inner surface of the cover member. Therefore, the cover member 6 is recessed on the outer surface at the pressed areas where the inner projections 7 are formed. The four lower corners of the cover member 6 are cut away as indicated by reference numeral 8 (FIG. 2) so as to form corner notches and another notch 9 is cut in the cover member 6 between the opposite ends extending from one side edge towards the longitudinal axis of the cover member. The other cover member 6' is identical with the cover member 6, but symmetric to the latter, that is, the cover member 6' is provided with inner projections 7' and 7' at the opposite end edges along the longitudinal axis of the cover member which are formed in the same manner as mentioned in connection with the inner projections 7 and 7 of the cover member 6 and a notch 9' is cut in the cover member between the opposite ends extending from the side edge thereof adjacent to the notched side edge of the mating cover member 6 towards the longitudinal axis of the cover member 6'. The cover member 6' is also formed at the four lower corners thereof with corner notches 8'. The support disc 3 is provided in its periphery with a pair of notches 10 and 10 in diametrically opposite and symmetrical positions with respect to the center bore 4 and a pair of ears 11 and 11 are also provided in the periphery in diametrically opposite and symmetrical positions with respect to the center bore and between the pair of notches 10. One of the notches 10 is adapted to receive one of the inner projections 7 of the cover member 6 whereas the other notch 10 is adapted to received one of the inner projections 7' of the cover member 6'. The ears 11 are respectively adapted to be received in the mating openings defined by the two pairs of mating corner notches 8 and 8' at the adjacent corners of the cover members 6 and 6', respectively. Similarly, the support disc 3' is also provided in its periphery with a pair of notches 10' (only one is shown in FIG. 2) in diametrically opposite and symmetrical positions with respect to the center bore 4' and a pair of ears 11, 11' are also provided in the periphery in diametrically opposite and symmetrical with respect to the center bore and between the pair of notches 10'. One of the notches 10 ' is adapted to receive the inner projection 7 at the adjacent end edge of the cover member 6 whereas the other notch 10' is adapted to receive the inner projection 7' at the adjacent end edge of the cover member 6'.

The ears 11' are respectively adapted to be received in the openings defined by the two pairs of mating corner notches 8 and 8' at the adjacent corners of the cover members 6 and 6', respectively.

A rectifier element 12 is fixedly mounted on the rotor shaft 2 adjacent to the inner surface of the support disc 3. An arcuate brush holder 13 supporting a pair of brushes 14 and 14 and provided with notches 15 and 15 at the opposite ends adjacent to the inner surface is fitted in the rectangular opening defined by the mating notches 9 and 9' at the adjacent side edges of the cover members 6 and 6' the axis of which opening is perpendicular to the longitudinal axis of the rotor shaft 2 by fitting the notches 15 onto the opposite end edges of the rectangular opening. When the brush holder 13 is positioned on the cover members 6 and 6' in the manner mentioned above the brushes 14 supported thereby pinch the rectifier element 12 therebetween. Reference numeral 17 denotes connectors attached to the brush holder 13 and adapted to be connected to electric cords (not shown) which are connected at the other ends to suitable power supply (not shown). The connection of the pair of cover members 6 and 6' is further assured by applying a piece of wide adhesive tape 18 around the periphery of these cover members covering a distance from a point adjacent to the support disc 3'. The thus completed motor assembly is housed in a suitable metallic casing (not shown).

As clear from the foregoing description of a preferred embodiment of the present invention, since the supporting discs 3 and 3' supporting the rotor shaft 2 concurrently serve as permanent magnets which face to the rotor 1, the construction of the miniature motor is greatly simplified. Furthermore, since the semicircle section magnetic cover members 6 and 6' are held in position on the supporting discs and 3' made of magnets by the magnetic attractive force of the discs and the mechanical means comprising the inner projection-notch-ear arrangement, the cover members can be readily and positively held in position on the supporting discs without the necessity for use of any rivets, setscrews and the like fastening means. In addition, securing of the cover members together is brushes assured by applying the adhesive tape around the periphery of the cover members.

Furthermore, according to the present invention, since all the component parts except the brushes have circle or semicircle configurations as shown and described herein, all the processing operations prior to the final operation, in which the adhesive tape is applied around the periphery of the mating pair of cover members, can be readily effected with a high efficiency through the utilization of the rolling movement of the circle or semicircle cross section component parts and therefore, the novel miniature motor is suitable for a mass production scale based on the conveyor system. In addition, when it is desired to disassemble the miniature motor, the component parts of the motor can be readily and promptly separated apart only by stripping the tape off the cover members.

While the present invention has been illustrated and described in detail in the drawing and foregoing description, the same is to be considered as illustrative and not restrictive in character, it being understood that only the preferred embodiment has been shown and described and that all changes and modifications that come within the spirit of the invention and the scope of the claims are also desired to be protected.

What I claim is:

1. In a miniature motor for moving toys having a rotor with a rotary shaft on which said rotor is mounted for movement therewith, a pair of spaced supporting discs made of permanent magnets and rotatably supporting said rotor shaft at the opposite ends thereof, a pair of semicircular cross section cover members mating at their adjacent side edges and held in position on said pair of supporting discs by the attractive force of the discs and mechanical means for surrounding said rotor in peripherally spaced relation thereto, a rectifier element mounted on said rotor shaft, a pair of brushes which pinch said rectifier element therebetween and adhesive tape applied around the periphery of said pair of cover members for securing the cover members together, the improvement therein wherein said mechanical means comprises two pairs of notches each pair of which are provided in the periphery of each of said pair of supporting discs in diametrically opposite and symmetrical positions with respect to the center of the associated disc, two pairs of ears each pair of which are provided in the periphery of each of said pair of supporting discs in diametrically opposite and symmetrical positions with respect to the center of the associated disc and between said pair of notches, two pairs of inner projections each of which are provided at adjacent end edges of said pair of covers members and adapted to be received in the notches in the associated supporting disc and two pairs of openings each pair of which are defined by mating notches provided at the lower corners of said pair of cover members.

2. A miniature motor for moving toys as set forth in claim 1, in which said pair of cover members are provided with mating notches at the adjacent side edges of the cover members between the opposite ends thereof to define an opening and said pair of brushes are supported by an arcuate brush holder having a pair of notches at the opposite ends fitted on the mating opposite ends edges of said opening defined by the side edge notches.

3. A miniature motor for moving toys as set forth in claim 1, in which said pair of supporting disc have center bores in which bearings are freely received and said opposite ends of the rotor shaft are journaled in said bearings.